United States Patent
Jung

(10) Patent No.: US 9,750,064 B2
(45) Date of Patent: *Aug. 29, 2017

(54) SCHEMES FOR PROVIDING WIRELESS COMMUNICATION

(71) Applicant: EMPIRE TECHNOLOGY DEVELOPMENT LLC, Wilmington, DE (US)

(72) Inventor: Yang-Won Jung, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,890

(22) Filed: Mar. 11, 2016

(65) Prior Publication Data
US 2016/0198502 A1 Jul. 7, 2016

Related U.S. Application Data

(63) Continuation of application No. 14/455,043, filed on Aug. 8, 2014, now Pat. No. 9,326,232, which is a
(Continued)

(51) Int. Cl.
*H04W 4/00* (2009.01)
*H04W 76/02* (2009.01)
(Continued)

(52) U.S. Cl.
CPC ......... *H04W 76/022* (2013.01); *H04W 12/06* (2013.01); *H04W 48/02* (2013.01);
(Continued)

(58) Field of Classification Search
CPC ..................................................... H04W 48/18
(Continued)

(56) References Cited

U.S. PATENT DOCUMENTS 7,562,393 B2 7/2009 Buddhikot et al.
8,885,613 B2 11/2014 Sachs et al.
(Continued)

FOREIGN PATENT DOCUMENTS

DE 202006005211 U1 10/2006
EP 2242312 A1 10/2010
(Continued)

OTHER PUBLICATIONS

"3rd Generation Partnership Project; Technical Specification Group Services and System Aspects; Architecture enhancements for non-3GPP accesses", http://www.3gpp.org, Mar. 2011, 22 pages.
(Continued)

*Primary Examiner* — Shripal Khajuria
(74) *Attorney, Agent, or Firm* — Brundidge & Stanger, P.C.

(57) ABSTRACT

Technologies are generally described for providing wireless communications. In some examples, a method performed under control of a mobile operating server may include determining whether there is an authenticated wireless access point around a mobile device, if there is no authenticated wireless access point, determining whether there is a non-authenticated wireless access point whose capacity is over a predetermined value around the mobile device and if there is a non-authenticated wireless access point whose capacity is over the predetermined value, instructing the mobile device to connect to a wireless local area network provided by the non-authenticated wireless access point.

20 Claims, 6 Drawing Sheets

Related U.S. Application Data continuation of application No. 13/978,553, filed as application No. PCT/KR2012/001959 on Mar. 19, 2012, now Pat. No. 8,824,443.

(51) Int. Cl.
| | |
|---|---|
| *H04W 48/02* | (2009.01) |
| *H04W 48/18* | (2009.01) |
| *H04W 48/20* | (2009.01) |
| *H04W 84/12* | (2009.01) |
| *H04W 12/06* | (2009.01) |
| *H04W 48/06* | (2009.01) |

(52) U.S. Cl.
CPC .......... *H04W 48/18* (2013.01); *H04W 48/20* (2013.01); *H04W 76/02* (2013.01); *H04W 84/12* (2013.01); *H04W 48/06* (2013.01)

(58) Field of Classification Search
USPC ........................................................ 370/338
See application file for complete search history.

(56) References Cited

U.S. PATENT DOCUMENTS

| | | |
|---|---|---|
| 2005/0119001 A1 | 6/2005 | Watanabe |
| 2006/0002342 A1 | 1/2006 | Lin |
| 2006/0221901 A1 | 10/2006 | Yaqub et al. |
| 2006/0268767 A1 | 11/2006 | Sato et al. |
| 2013/0051328 A1 | 2/2013 | Chandra |

FOREIGN PATENT DOCUMENTS

| | | |
|---|---|---|
| JP | 2005159929 A | 6/2005 |
| JP | 2008503109 A | 1/2008 |
| JP | 2010206442 A | 9/2010 |
| JP | 2011071963 A | 4/2011 |
| JP | 2011519521 A | 7/2011 |
| WO | 2004068877 A1 | 8/2004 |
| WO | 2006114628 A2 | 11/2006 |
| WO | 2011024400 A1 | 3/2011 |
| WO | 2011098660 A1 | 8/2011 |

OTHER PUBLICATIONS

"Mobile Data Offload & Onload," Juniper Research, accessed at http://juniperresearch.com/reports/ Mobile_Data_Offload_and_On load, accessed on Sep. 1, 2011, pp. 9.

Nikitopoulos, D., et al. "Authentication platform for seamless handover in heterogeneous environments," Joint International Conference on Autonomic and Autonomous Systems and International Conference on Networking and Services , IEEE, pp. 36 (Sep. 2005).

Pan Ken, F, et al., "Extending 3G/WiMAX Networks and Services through Residential Access Capacity [Wireless Broadband Access]" Communication Magazine, IEEE, vol. 45, Issue 12, pp. 62-69, Nov. 2007.

Weissberger, A., "Metro WiFi Reborn: City Wide Mega-Hot Spot for Mobile Data Offload," pp. 2, May 29, 2011.

International Search Report with Written Opinion for International Application No. PCT/KR2012/001959, Korean Intellectual Property Office, mailed on Nov. 28, 2012.

SCHEMES FOR PROVIDING WIRELESS COMMUNICATION

CROSS-REFERENCE TO RELATED APPLICATIONS

The present application is a continuation application under 35 U.S.C. §120 of U.S. application Ser. No. 14/455,043, filed on Aug. 08, 2014, now U.S. Patent No. 9,326,232, which is a continuation application under 35 U.S.C. §120 of U.S. application Ser. No. 13/978,553, filed on Jul. 08, 2013, now U.S. Pat. No. 8,824,443, which is a U.S. National Stage filing under 35 U.S.C. §371 of International Application No. PCT/KR12/01959, filed on Mar. 19, 2012.The aforementioned U.S. Application and International Application, including any appendices or attachments thereof, are herby incorporated by reference in their entireties.

BACKGROUND ART

The availability of third generation (3G) and fourth generation (4G) mobile telecommunications technologies, and Wi-Fi wireless access technologies makes it possible to provide wireless communications. It is generally preferable to use Wi-Fi networks for data transmission because Wi-Fi wireless access technologies are typically available at lower cost but with higher throughput than the third generation (3G) and/or fourth generation (4G) mobile telecommunications technologies. However, users tend to use the 3G and/or 4G mobile telecommunications networks due to a security issue even when a Wi-Fi network is available.

DISCLOSURE OF INVENTION

Solution to Problem

In an example, a method performed under control of a mobile operating server may include determining whether there is an authenticated Wi-Fi access point around a mobile device; if there is an authenticated Wi-Fi access point around the mobile device, instructing the mobile device to connect to a Wi-Fi network provided by the authenticated Wi-Fi access point, if there is no authenticated Wi-Fi access point around the mobile device, determining whether there is a non-authenticated Wi-Fi access point whose capacity is over a predetermined value around the mobile device, if there is a non-authenticated Wi-Fi access point whose capacity is over the predetermined value around the mobile device, instructing the mobile device to connect to a Wi-Fi network provided by the non-authenticated Wi-Fi access point whose capacity is over the predetermined value, initiating a virtual private network (VPN) with the mobile device connected to the Wi-Fi network provided by the authenticated Wi-Fi access point or the non-authenticated Wi-Fi access point and instructing the mobile device to disable uplink transmission from the mobile device to the authenticated Wi-Fi access point or the non-authenticated Wi-Fi access point, and to maintain downlink transmission from the authenticated Wi-Fi access point or the non-authenticated Wi-Fi access point to the mobile device.

In an example, a method performed under control of a mobile operating server may include determining whether there is an authenticated wireless access point around a mobile device, if there is no authenticated wireless access point around the mobile device, determining whether there is a non-authenticated wireless access point whose capacity is over a predetermined value around the mobile device and if there is a non-authenticated wireless access point whose capacity is over the predetermined value around the mobile device, instructing the mobile device to connect to a wireless local area network provided by the non-authenticated wireless access point whose capacity is over the predetermined value.

In an example, a method performed under control of a mobile operating server may include determining whether there is a wireless access point around a mobile device and if there is a wireless access point around the mobile device, instructing a mobile device to connect to a wireless local area network provided by the wireless access point, to disable uplink transmission from the mobile device to the wireless access point through the wireless local area network, and to maintain downlink transmission from the wireless access point to the mobile device through the wireless local area network.

In an example, a method performed under control of a mobile device may include detecting a wireless local area network, connecting to the detected wireless local area network, receiving data through the wireless local area network and transmitting data through a mobile telecommunications network provided by a mobile operating server.

In an example, a mobile operating server may include an available wireless access point determination unit configured to determine whether there is an available wireless access point around a mobile device and a network connection control unit configured to generate an instruction for the mobile device to use a wireless local area network provided by the available wireless access point for downlink communication and to use a mobile telecommunications network provided by the mobile operating server for uplink communication.

In an example, a computer-readable storage medium may store thereon computer-executable instructions that, in response to execution, cause a mobile operating server to perform operations including determining whether there is an authenticated wireless access point around a mobile device, if there is no authenticated wireless access point around the mobile device, determining whether there is a non-authenticated wireless access point whose capacity is over a predetermined value around the mobile device and if there is a non-authenticated wireless access point whose capacity is over the predetermined value around the mobile device, instructing the mobile device to connect to a wireless local area network provided by the non-authenticated wireless access point whose capacity is over the predetermined value.

In an example, a computer-readable storage medium may store thereon computer-executable instructions that, in response to execution, cause a mobile operating server to perform operations including determining whether there is a wireless access point around a mobile device and if there is a wireless access point around the mobile device, instructing a mobile device to connect to a wireless local area network provided by the wireless access point, to disable uplink transmission from the mobile device to the wireless access point through the wireless local area network, and to maintain downlink transmission from the wireless access point to the mobile device through the wireless local area network.

In an example, a computer-readable storage medium may store thereon computer-executable instructions that, in response to execution, cause a mobile device to perform operations including detecting a wireless local area network, connecting to the detected wireless local area network, receiving data through the wireless local area network and transmitting data through a mobile telecommunications network provided by a mobile operating server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

MODE FOR THE INVENTION

Figure 1A:
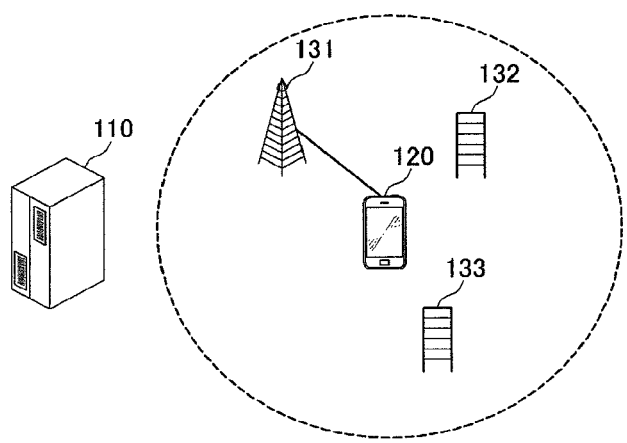
FIGS. 1A to 1C schematically show illustrative examples of network communications environments including a mobile operating server, at least one wireless access point and a mobile device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to schemes for providing wireless communications.

Technologies are generally described for a method for providing a mobile device with wireless communications. In some examples, a mobile operating server may determine whether there is an authenticated wireless access point around the mobile device. If there is an authenticated wireless access point around the mobile device, the mobile operating server may instruct the mobile device to connect to a wireless local area network provided by the authenticated wireless access point. If, however, there is no authenticated wireless access point around the mobile device, the mobile operating server may determine whether there is a non-authenticated wireless access point whose capacity is over a predetermined value around the mobile device. If there is a non-authenticated wireless access point whose capacity is over the predetermined value around the mobile device, the mobile operating server may instruct the mobile device to connect to a wireless local area network provided by the non-authenticated wireless access point. The authenticated wireless access point may include at least one of a wireless access point controlled by the mobile operating server and a wireless access point previously used by the mobile device. If there is no non-authenticated wireless access point whose capacity is over the predetermined value around the mobile device, the mobile operating server may instruct the mobile device to connect to a mobile telecommunications network such as a 3rd generation (3G) mobile telecommunications network and a 4th generation (4G) mobile telecommunications network.

Figure 1B:
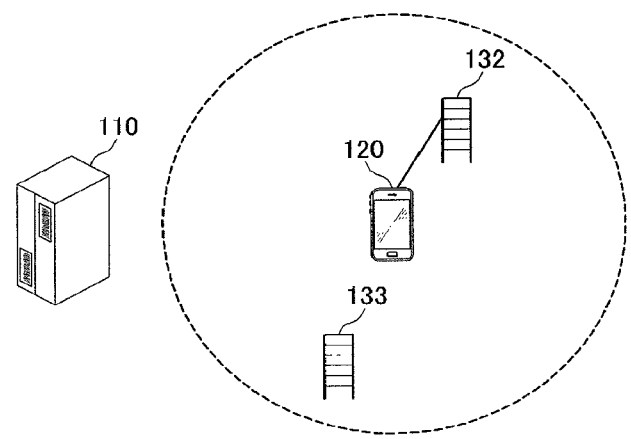
Figure 1C:
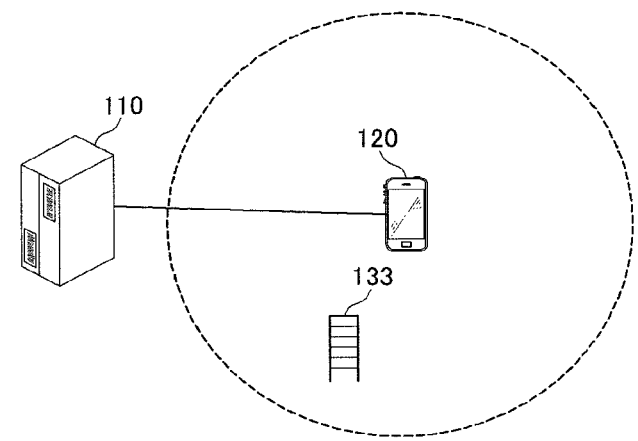

FIGS. 1A to 1C schematically show illustrative examples of network communications environments including a mobile operating server, at least one wireless access point and a mobile device in accordance with at least some embodiments described herein.

As illustrated in FIG. 1A, there may be at least one wireless access point 131, 132, 133 around a mobile device 120. Each of wireless access point 131, 132, 133 may include a Wi-Fi access point. For example, in the example illustrated in FIG. 1A, it may be assumed that one authenticated wireless access point 131 and two non-authenticated wireless access points 132, 133 are located around mobile device 120. Although FIG. 1A illustrates that three wireless access points are located around mobile device 120, one skilled in the art will appreciate that any number of wireless access points can be located around mobile device 120.

In some embodiments, authenticated wireless access point 131 may include a wireless access point provided and/or controlled by a mobile operating server 110. Further, authenticated wireless access point 131 may include a wireless access point previously used by mobile device 120. By way of example, but not limitation, mobile operating server 110 may consider the wireless access point previously used by mobile device 120 to have sufficient capacity and/or high security.

In some embodiments, non-authenticated wireless access points 132, 133 may include wireless access points other than authenticated wireless access point 131. By way of example, but not limitation, non-authenticated wireless access points 132, 133 may include wireless access points that are not provided by mobile operating server 110. By way of example, but not limitation, non-authenticated wireless access points 132, 133 may also include wireless access points not previously used by mobile device 120. In such cases, the capacities of non-authenticated wireless access points 132, 133 may have not yet determined or estimated.

In some embodiments, mobile operating server 110 may determine whether there are wireless access points 131, 132, 133 around mobile device 120. In some embodiments, mobile operating server 110 may first determine whether there is authenticated wireless access point 131 around mobile device 120. When mobile operating server 110 determines that there is authenticated wireless access point 131 around mobile device 120, mobile operating server 110 may instruct mobile device 120 to connect to a wireless local area network provided by authenticated wireless access point 131. By way of example, but not limitation, the wireless local area network provided by authenticated wireless access point 131 may include a Wi-Fi network.

In some embodiments, as in the example illustrated FIG. 1B, if there is no authenticated wireless access point 131 around mobile device 120, mobile operating server 110 may determine whether there is non-authenticated wireless access points 132 or 133 around mobile device 120. If mobile operating server 110 determines that there are non-authenticated wireless access points 132, 133 around mobile device 120, mobile operating server 110 may measure capacities of non-authenticated wireless access points 132, 133. In some embodiments, mobile operating server 110 may determine whether the measured capacities of non-authenticated wireless access points 132, 133 are over a predetermined value.

By way of non-limiting example, mobile device 120 may transmit/receive test packets to/from non-authenticated wireless access points 132, 133 through wireless local area networks provided by non-authenticated wireless access points 132, 133. While the test packets are transmitted between mobile device 120 and non-authenticated wireless access points 132, 133, mobile device 120 may be kept connected to a mobile telecommunications network provided by mobile operating server 110. By way of example, but not limitation, the mobile telecommunications network may include at least one of a 3rd generation (3G) mobile telecommunications network, a 4th generation (4G) mobile telecommunications network, and any other mobile telecommunications networks that can be provided by mobile operating server 110. Mobile device 120 may report, to mobile operating server 110, information on the capacities of non-authenticated wireless access point 132, 133 acquired by transmitting/receiving the test packets to/from non-authenticated wireless access points 132, 133. For example, the information on the capacities of non-authenticated wireless access points 132, 133 may include bandwidths of wireless local area networks provided by non-authenticated wireless access points 132, 133. In some embodiments, the mobile device 120 may report to mobile operating server 110 not only the information on the capacities of non-authenticated wireless access points 132, 133, but also, not limited to, IP (Internet Protocol) addresses, MAC (Media Access Control) addresses, SSIDs (Subsystem Identifications) of non-authenticated wireless access point 132, 133 and a GPS (Global Positioning System) information of mobile device 120, etc.

In some embodiments, mobile operating server 110 may measure the capacities of non-authenticated wireless access points 132, 133 based on the information on the capacities of non-authenticated wireless access points 132, 133 reported or received from mobile device 120. By way of example, but not limitation, mobile operating server 110 may measure, e.g., average capacities of non-authenticated wireless access points 132, 133 based on the information reported or received from mobile device 120 and store the capacity information thereon.

In some embodiments, mobile operating server 110 may determine whether the measured capacities of non-authenticated wireless access points 132, 133 are over the predetermined value. By way of example, but not limitation, if bandwidths of the wireless local area networks provided by non-authenticated wireless access points 132, 133 are equal to or wider than about 80% of a bandwidth of the mobile telecommunications network provided by mobile operating server 110, mobile operating server 110 may determine that the capacities of non-authenticated wireless access points 132, 133 are over the predetermined value.

In some embodiments, mobile operating server 110 may determine whether the measured capacities of non-authenticated wireless access points 132, 133 are over the predetermined value in consideration of a task to be executed in mobile device 120. By way of example, but not limitation, a relatively narrow bandwidth is required when web surfing is performed on mobile device 120, while a relatively wide bandwidth is required when a movie is played on mobile device 120. For example, when web surfing is performed on mobile device 120, if the bandwidths of the wireless local area networks provided by non-authenticated wireless access points 132, 133 is equal to or wider than about 70% of the bandwidth of the mobile telecommunications network provided by mobile operating server 110, mobile operating server 110 may determine that the capacities of non-authenticated wireless access points 132, 133 are over the predetermined value. Meanwhile, by way of example, when a movie is played on mobile device 120, if the bandwidths of the wireless local area networks provided by non-authenticated wireless access points 132, 133 is equal to or wider than about 90% of the bandwidth of the mobile telecommunications network provided by mobile operating server 110, mobile operating server 110 may determine that the capacities of non-authenticated wireless access points 132, 133 are over the predetermined value.

In some embodiments, if there is a non-authenticated wireless access point whose capacity is over a predetermined value around mobile device 120, mobile operating server 110 may instruct mobile device 120 to connect to a wireless local area network provided by the non-authenticated wireless access point whose capacity is over the predetermined value. By way of example, but not limitation, it may be assumed that the capacity of non-authenticated wireless access point 132 is larger than the predetermined value and the capacity of non-authenticated wireless access point 133 is smaller than the predetermined value. In such cases, mobile operating server 110 may instruct mobile device 120 to connect to a wireless local area network provided by non-authenticated wireless access point 132. By way of example, but not limitation, the wireless local area network provided by non-authenticated wireless access point 132 may include a Wi-Fi network.

In some embodiments, as in the example illustrated in FIG. 1C, if there is no non-authenticated wireless access point 132 whose capacity is over the predetermined value around mobile device 120 but there only exists non-authenticated wireless access point 133 whose capacity is not over the predetermined value, mobile operating server 110 may instruct mobile device 120 to connect to or keep connection with the mobile telecommunications network provided by mobile operating server 110. In some embodiments, if there is no wireless access point including authenticated wireless access point 131 and non-authenticated wireless access points 132, 133 around mobile device 120, mobile operating server 110 may also instruct mobile device 120 to connect to or keep connection with the mobile telecommunications network provided by mobile operating server 110.

Figure 2:
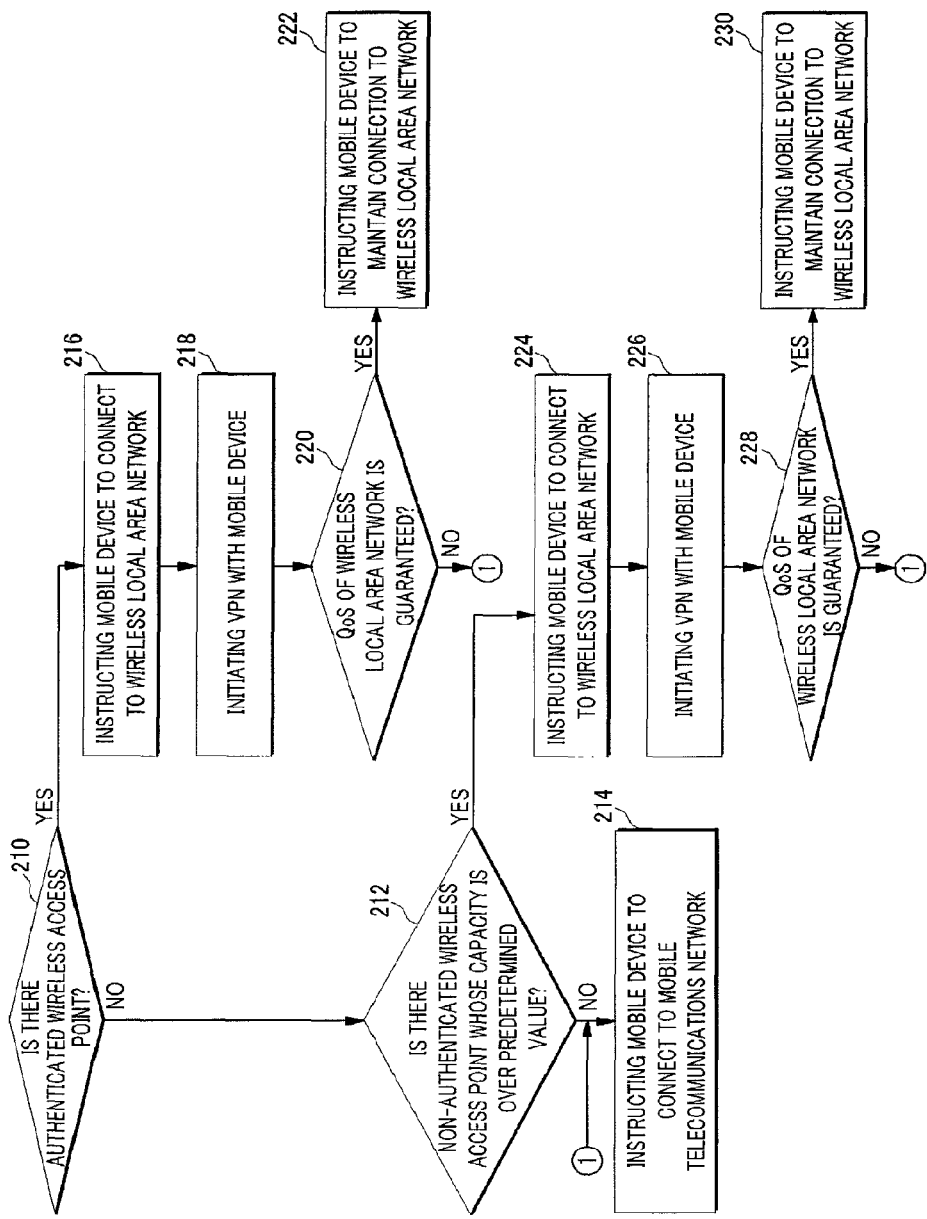
FIG. 2 shows an example flow diagram of a process of a mobile operating server for providing a mobile device with wireless communications, arranged in accordance with at least some embodiments described herein.

FIG. 2 shows an example flow diagram of a process of a mobile operating server for providing a mobile device with wireless communications in accordance with at least some embodiments described herein. The method in FIG. 2 may be implemented in the network communication environments including mobile operating server 110, mobile device 120 and at least one of wireless access points 131, 132, 133, as illustrated in FIGS. 1A to 1C. An example process may include one or more operations, actions, or functions as illustrated by one or more blocks 210, 212, 214, 216, 218, 220, 222, 224, 226, 228 and/or 230. Although illustrated as discrete blocks, various blocks may be divided into additional blocks, combined into fewer blocks, or eliminated, depending on the desired implementation. Processing may begin at block 210.

At block 210, mobile operating server 110 may determine whether there is authenticated wireless access point 131 around mobile device 120. If mobile operating server 110 determines that there is no authenticated wireless access point 131 around mobile device 120, processing may proceed to block 212, while if mobile operating server 110 determines that there is authenticated wireless access point 131 around mobile device 120, processing may proceed to block 216.

At block 212, mobile operating server 110 may determine whether there is non-authenticated wireless access point 132 whose capacity is over a predetermined value around mobile device 120. If mobile operating server 110 determines that there is no non-authenticated wireless access point 132 whose capacity is over the predetermined value around mobile device 120, processing may proceed to block 214, while otherwise, processing may proceed to block 224.

At block 214, mobile operating server 110 may instruct mobile device 120 to connect to a mobile telecommunications network provided by mobile operating server 110. By way of example, but not limitation, the mobile telecommunications network may include a 3rd generation (3G) mobile telecommunications network and a 4th generation (4G) mobile telecommunications network, etc.

Referring back to block 210, if mobile operating server 110 determines that there is authenticated wireless access point 131 around mobile device 120, mobile operating server 110 may instruct mobile device 120 to connect to a wireless local area network provided by authenticated wireless access point 131 at block 216. Processing may continue to block 218.

At block 218, mobile operating server 110 may initiate a virtual private network (VPN) with mobile device 120 connected to the wireless local area network provided by authenticated wireless access point 131. By way of example, but not limitation, mobile operating server 110 may provide mobile device 120 with an encryption key. Mobile device 120 may encrypt data by using the encryption key provided by mobile operating server 110 and transmit the encrypted data to mobile operating server 110. Mobile operating server 110 may decrypt the data received from mobile device 120 by using the same key as the encryption key provided to mobile device 120. Thereafter, mobile operating server 110 may transmit the decrypted data to a destination to which mobile device 120 has intended to send the data. In some embodiments, in order for mobile operating server 110 to initiate a virtual private network (VPN) with mobile device 120, an application or module for VPN, for example, may need to be previously installed in mobile device 120. If the application or module for VPN is not installed in mobile device 120, the application or module for VPN may be automatically downloaded from mobile operating server 110 to mobile device 120 and installed therein. Processing may continue to block 220.

At block 220, mobile operating server 110 may determine whether a quality of service (QoS) of the wireless local area network to which mobile device 120 is connected is guaranteed. By way of example, but not limitation, at block 220, mobile operating server 110 may determine whether a quality of service (QoS) of the wireless local area network provided by authenticated wireless access point 131 is guaranteed. Mobile operating server 110 may determine whether a quality of service (QoS) of the wireless local area network based at least in part on at least one of a capacity of the wireless local area network to which mobile device 120 is connected, a task to be executed in mobile device 120, and transmission speed of a test packet or the like.

In some embodiments, at block 220, mobile operating server 110 may receive from mobile device 120 a flag indicating amounts of traffic to be transmitted between mobile operating server 110 and mobile device 120 through the wireless local area network provided by authenticated wireless access point 131. If the amounts of traffic are not transmitted through the wireless local area network provided by authenticated wireless access point 131 within a predetermined time, mobile operating server 110 may determine that a quality of service (QoS) of the wireless local area network provided by authenticated wireless access point 131 is not guaranteed.

If mobile operating server 110 determines at block 220 that the quality of service (QoS) of the wireless local area network provided by authenticated wireless access point 131 is guaranteed, processing may proceed to block 222, while if mobile operating server 110 determines that the quality of service (QoS) of the wireless local area network provided by authenticated wireless access point 131 is not guaranteed, processing may proceed to block 214.

At block 222, mobile operating server 110 may instruct mobile device 120 to maintain the connection to the wireless local area network provided by authenticated wireless access point 131.

Referring back to block 212, if mobile operating server 110 determines that there is non-authenticated wireless access point 132 whose capacity is over the predetermined value around mobile device 120, mobile operating server 110 may instruct mobile device 120 to connect to a wireless local area network provided by non-authenticated wireless access point 132 at block 224. Processing may continue to block 226.

At block 226, mobile operating server 110 may initiate a virtual private network (VPN) with mobile device 120 connected to the wireless local area network provided by non-authenticated wireless access point 132. Processing may continue to block 228.

At block 228, mobile operating server 110 may determine whether a quality of service (QoS) of the wireless local area network provided by non-authenticated wireless access point 132 is guaranteed. If mobile operating server 110 determines that the quality of service (QoS) of the wireless local area network provided by non-authenticated wireless access point 132 is guaranteed, processing may proceed to block 230, while if mobile operating server 110 determines that the quality of service (QoS) of the wireless local area network provided by non-authenticated wireless access point 132 is not guaranteed, processing may proceed to block 214.

At block 230, mobile operating server 110 may instruct mobile device 120 to maintain the connection to the wireless local area network provided by non-authenticated wireless access point 132.

Figure 3:
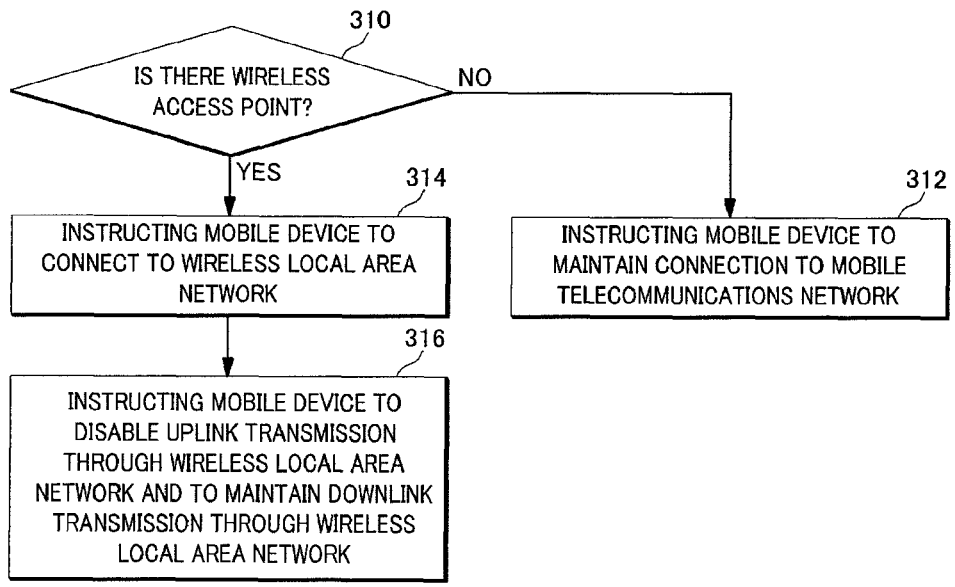
FIG. 3 shows another example flow diagram of a process of a mobile operating server for providing a mobile device with wireless communications, arranged in accordance with at least some embodiments described herein.

FIG. 3 shows another example flow diagram of a process of a mobile operating server for providing a mobile device with wireless communications in accordance with at least some embodiments described herein. The method in FIG. 3 may be implemented in the network communication environments including mobile operating server 110, mobile device 120 and at least one of wireless access points 131, 132, 133, as illustrated in FIGS. 1A-1C. An example process may include one or more operations, actions, or functions as illustrated by one or more blocks 310, 312, 314 and/or 316. Although illustrated as discrete blocks, various blocks may be divided into additional blocks, combined into fewer blocks, or eliminated, depending on the desired implementation. Processing may begin at block 310.

At block 310, mobile operating server 110 may determine whether there is a wireless access point around mobile device 120. By way of example, but not limitation, at block 310, mobile operating server 110 may determine whether there is at least one of authenticated wireless access point 131 and non-authenticated wireless access point 132 whose capacity is over the predetermined value around mobile device 120. If there is no wireless access point (i.e., authenticated wireless access point 131 and/or non-authenticated wireless access point 132 whose capacity is over the predetermined value) around mobile device 120, processing may proceed to block 312, while if there is the wireless access point around mobile device 120, processing may proceed to block 314.

At block 312, mobile operating server 110 may instruct mobile device 120 to connect to, or maintain the connection to a mobile telecommunications network provided by mobile operating server 110.

Referring back to block 310, if it is determined that there is the wireless access point around mobile device 120, mobile operating server 110 may instruct mobile device 120 to connect to a wireless local area network provided by the wireless access point at block 314. By way of example, but not limitation, when there is authenticated wireless access point 131 around mobile device 120, mobile operating server 110 may instruct mobile device 120 to connect to a wireless local area network provided by authenticated wireless access point 131. If there is no authenticated wireless access point 131, but there is non-authenticated wireless access point 132 whose capacity is over the predetermined value around mobile device 120, mobile operating server 110 may instruct mobile device 120 to connect to a wireless local area network provided by non-authenticated wireless access point 132 whose capacity is over the predetermined value.

Although not illustrated in FIG. 3, in some embodiments, mobile operating server 110 may initiate a virtual private network (VPN) with mobile device 120 connected to the wireless local area network provided by authenticated wireless access point 131 or non-authenticated wireless access point 132 whose capacity is over the predetermined value, at block 314.

Further, in some embodiments, mobile operating server 110 may determine whether a quality of service (QoS) of the wireless local area network provided by authenticated wireless access point 131 or non-authenticated wireless access point 132 whose capacity is over the predetermined value is guaranteed, at block 314. If mobile operating server 110 determines that the quality of service (QoS) of the wireless local area network provided by authenticated wireless access point 131 or non-authenticated wireless access point 132 is guaranteed, mobile operating server 110 may instruct mobile device 120 to keep the connection to the wireless local area network provided by authenticated wireless access point 131 or non-authenticated wireless access point 132. Meanwhile, if mobile operating server 110 determines that the quality of service (QoS) of the wireless local area network provided by authenticated wireless access point 131 or non-authenticated wireless access point 132 is not guaranteed, mobile operating server 110 may instruct mobile device 120 to disconnect from the wireless local area network provided by authenticated wireless access point 131 or non-authenticated wireless access point 132 and to connect to the mobile telecommunications network provided by mobile operating server 110.

By way of example, but not limitation, mobile operating server 110 may receive from mobile device 120 a flag indicating amounts of traffic to be transmitted between mobile operating server 110 and mobile device 120 through the wireless local area network provided by authenticated wireless access point 131 or non-authenticated wireless access point 132. If the amounts of traffic are not transmitted through the wireless local area network provided by authenticated wireless access point 131 or non-authenticated wireless access point 132 within a predetermined time, mobile operating server 110 may determine that the quality of service (QoS) of the wireless local area network provided by authenticated wireless access point 131 or non-authenticated wireless access point 132 is not guaranteed. Processing may continue to block 316.

At block 316, when mobile device 120 transmits data (i.e., uplink transmission), mobile operating server 110 may instruct mobile device 120 to disable uplink transmission from mobile device 120 to authenticated wireless access point 131 or non-authenticated wireless access point 132 through the wireless local area network provided by authenticated wireless access point 131 or non-authenticated wireless access point 132. That is, mobile operating server 110 may instruct mobile device 120 to use the mobile telecommunications network provided by mobile operating server 110 for the uplink transmission.

Meanwhile, at block 316, when mobile device 120 receives data (i.e., downlink transmission), mobile operating server 110 may instruct mobile device 120 to maintain downlink transmission from authenticated wireless access point 131 or non-authenticated wireless access point 132 to mobile device 120 through the wireless local area network provided by authenticated wireless access point 131 or non-authenticated wireless access point 132.

Figure 4:
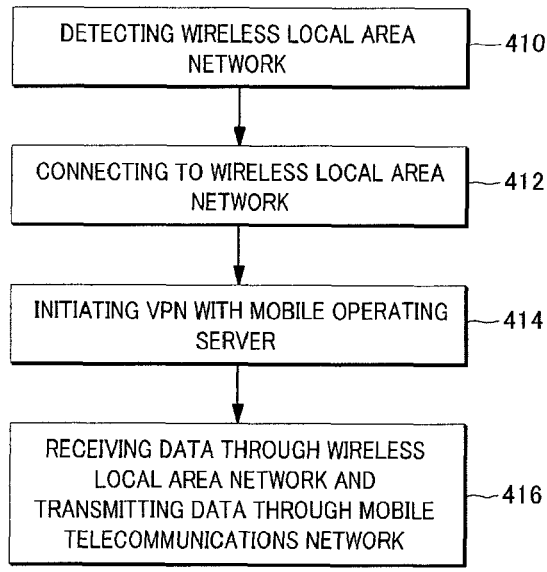
FIG. 4 shows an example flow diagram of a process of a mobile device for receiving and/or transmitting data, arranged in accordance with at least some embodiments described herein.

FIG. 4 shows an example flow diagram of a process of a mobile device for receiving and/or transmitting data in accordance with at least some embodiments described herein. The method in FIG. 4 may be implemented in the network communication environments including mobile operating server 110, mobile device 120 and at least one of wireless access points 131, 132, 133 as illustrated in FIGS. 1A-1C. An example process may include one or more operations, actions, or functions as illustrated by one or more blocks 410, 412, 414 and/or 416. Although illustrated as discrete blocks, various blocks may be divided into additional blocks, combined into fewer blocks, or eliminated, depending on the desired implementation. Processing may begin at block 410.

At block 410, mobile device 120 may detect a wireless local area network. By way of example, the wireless local area network may be provided by authenticated wireless access point 131 or non-authenticated wireless access point 132 whose capacity is over a predetermined value. Processing may continue to block 412.

At block 412, mobile device 120 may connect to the detected wireless local area network. Processing may continue to block 414.

At block 414, mobile device 120 may initiate a virtual private network (VPN) with mobile operating server 110. Processing may continue to block 416.

At block 416, mobile device 120 may receive data through a wireless local area network provided by authenticated wireless access point 131 or non-authenticated wireless access point 132 whose capacity is over a predetermined value, while transmitting data through a mobile telecommunications network provided by mobile operating server 110.

Figure 5:
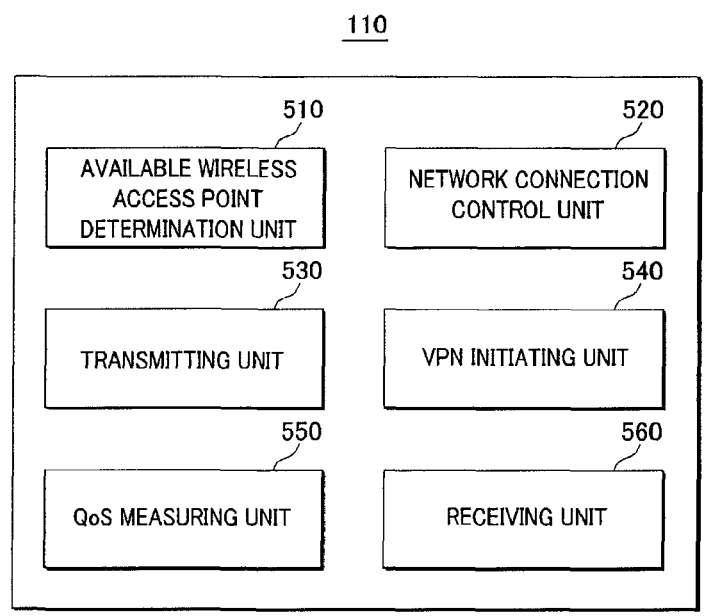
FIG. 5 shows a schematic block diagram illustrating an example architecture for a mobile operating server, arranged in accordance with at least some embodiments described herein.

FIG. 5 shows a schematic block diagram illustrating an example architecture for a mobile operating server in accordance with at least some embodiments described herein. As depicted in FIG. 5, mobile operating server 110 may include an available wireless access point determination unit 510, a network connection control unit 520, a transmitting unit 530, a VPN initiating unit 540, a QoS measuring unit 550 and a receiving unit 560. Although illustrated as discrete components, various components may be divided into additional components, combined into fewer components, or eliminated altogether while being contemplated within the scope of the disclosed subject matter.

Available wireless access point determination unit 510 may be configured to determine whether there is an available wireless access point around mobile device 120. By way of example, but not limitation, the available wireless access point may include a Wi-Fi access point. In some embodiments, available wireless access point determination unit 510 may determine whether there is authenticated wireless access point 131 around mobile device 120. If there is no authenticated wireless access point 131 around mobile device 120, available wireless access point determination unit 510 may determine whether there is non-authenticated wireless access point 132 whose capacity is over the predetermined value around mobile device 120.

Network connection control unit 520 may be configured to generate an instruction for mobile device 120 to connect the available wireless access point around mobile device 120 determined by available wireless access point determination unit 510. In some embodiments, if there is found authenticated wireless access point 131 around mobile device 120, network connection control unit 520 may generate an instruction for mobile device 120 to connect to a wireless local area network provided by authenticated wireless access point 131. Further, if there is found non-authenticated wireless access point 132 whose capacity is over the predetermined value around mobile device 120, network connection control unit 520 may generate an instruction for mobile device 120 to connect to a wireless local area network provided by non-authenticated wireless access point 132 whose capacity is over the predetermined value.

In some embodiments, network connection control unit 520 may generate an instruction for mobile device 120 to use the wireless local area network provided by the available wireless access point for downlink communication. Further, network connection control unit 520 may generate an instruction for mobile device 120 to use a mobile telecommunications network provided by mobile operating server 110 for uplink communication.

Transmitting unit 530 may be configured to transmit to mobile device 120 the instruction generated by network connection control unit 520.

VPN initiating unit 540 may be configured to initiate a virtual private network with mobile device 120 connected to the wireless local area network provided by the available wireless access point determined by available wireless access point determination unit 510.

QoS measuring unit 550 may be configured to determine whether a quality of service (QoS) of the wireless local area network provided by the available wireless access point determined by available wireless access point determination unit 510 is guaranteed. In some embodiments, if QoS measuring unit 550 determines that the quality of service (QoS) of the wireless local area network provided by the available wireless access point is guaranteed, network connection control unit 520 may generate an instruction for mobile device 120 to maintain connection to the wireless local area network. Meanwhile, if QoS measuring unit 550 determines that the quality of service (QoS) of the wireless local area network provided by the available wireless access point is not guaranteed, network connection control unit 520 may generate an instruction for mobile device 120 to disconnect from the wireless local area network.

Receiving unit 560 may be configured to receive a flag indicating amounts of traffic to be transmitted between mobile operating server 110 and mobile device 120 through the wireless local area network. If the amounts of traffic are not transmitted through the wireless local area network within a predetermined time, network connection control unit 520 may generate an instruction for mobile device 120 to disconnect from the wireless local area network.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
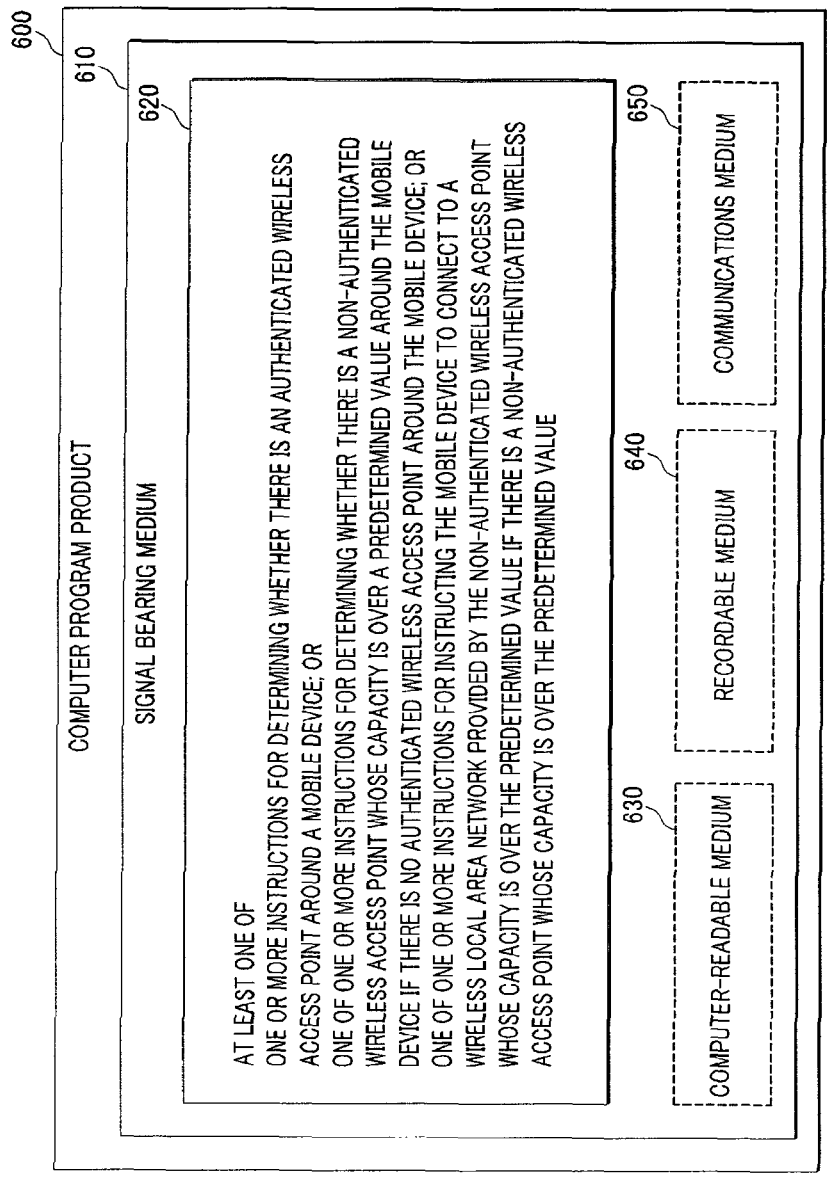
FIG. 6 illustrates a computer program product that may be utilized to provide a scheme for providing wireless communication, arranged in accordance with at least some embodiments described herein.

FIG. 6 illustrates a computer program product 600 that may be utilized to provide a scheme for providing wireless communication in accordance with at least some embodiments described herein. Computer program product 600 may include a signal bearing medium 610. Signal bearing medium 610 may include one or more instructions 620 that, when executed by, for example, a processor, may provide the functionality described above with respect to FIGS. 1-5. By way of example, instructions 620 may include: one or more instructions for determining whether there is an authenticated wireless access point around a mobile device; one or more instructions for determining whether there is a non-authenticated wireless access point whose capacity is over a predetermined value if there is no authenticated wireless access point around the mobile device; one or more instructions for instructing the mobile device to connect to a wireless local area network provided by the non-authenticated wireless access point whose capacity is over the predetermined value if there is a non-authenticated wireless access point whose capacity is over the predetermined value. Thus, for example, referring to FIG. 5, mobile operating server 110 may undertake one or more of the blocks shown in FIG. 2 in response to instructions 620.

Further, by way of example, instructions 620 may include: one or more instructions for determining whether there is a wireless access point around a mobile device; one or more instructions for instructing a mobile device to connect to a wireless local area network provided by the wireless access point, to disable uplink transmission from the mobile device to the wireless access point through the wireless local area network, and to maintain downlink transmission from the wireless access point to the mobile device through the wireless local area network if there is a wireless access point around the mobile device. Thus, for example, referring to FIG. 5, mobile operating server 110 may undertake one or more of the blocks shown in FIG. 3 in response to instructions 620.

Furthermore, by way of example, instructions 620 may include: one or more instructions for detecting a wireless local area network; one or more instructions for connecting to the detected wireless local area network; one or more instructions for receiving data through the wireless local area network; one or more instructions for transmitting data through a mobile telecommunications network provided by a mobile operating server. Thus, for example, mobile device 120 may undertake one or more of the blocks shown in FIG. 4 in response to instructions 620.

In some implementations, signal bearing medium 610 may encompass a computer-readable medium 630, such as, but not limited to, a hard disk drive (HDD), a compact disc (CD), a digital versatile disc (DVD), a digital tape, memory, etc. In some implementations, signal bearing medium 610 may encompass a recordable medium 640, such as, but not limited to, memory, read/write (R/W) CDs, R/W DVDs, etc. In some implementations, signal bearing medium 610 may encompass a communications medium 650, such as, but not limited to, a digital and/or an analog communication medium (e.g., a fiber optic cable, a waveguide, a wired communication link, a wireless communication link, etc.). Thus, for example, computer program product 600 may be conveyed to one or more modules of mobile operating server 110 or mobile device 120 by an RF signal bearing medium 610, where the signal bearing medium 610 is conveyed by a wireless communications medium 650 (e.g., a wireless communications medium conforming with the IEEE 802.11 standard).

Figure 7:
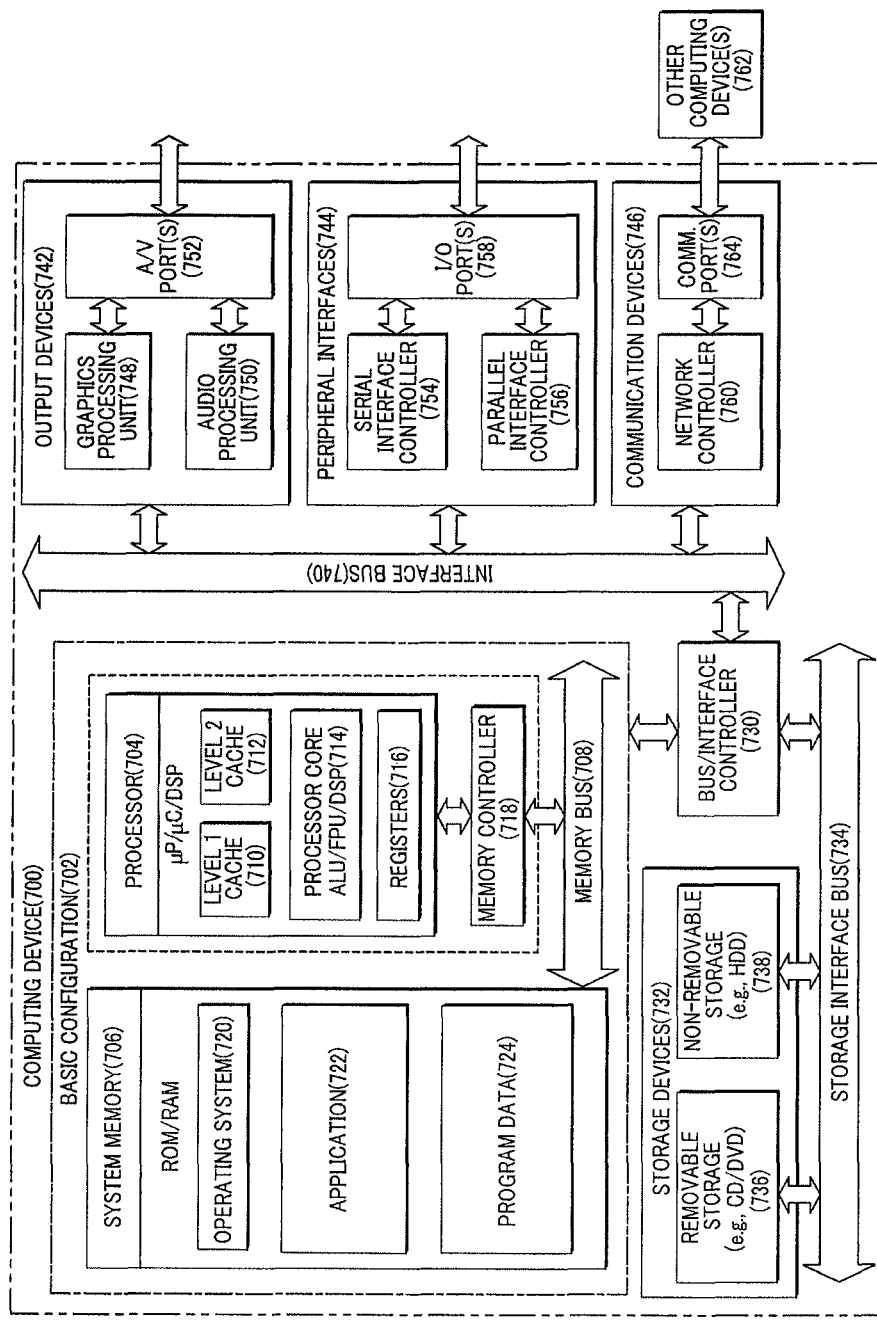
FIG. 7 is a block diagram illustrating an example computing device that may be utilized to provide a scheme for providing wireless communication, arranged in accordance with at least some embodiments described herein.

FIG. 7 is a block diagram illustrating an example computing device 700 that may be utilized to provide a scheme for providing wireless communication in accordance with at least some embodiments described herein. In these examples, elements of computing device 700 may be arranged or configured for a mobile operating server or a mobile device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some Implementations, memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" ( e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to connect a mobile device to a network, the method comprising:
   determining whether there is an authenticated Wi-Fi access point that is accessible to the mobile device through a local wireless communication protocol;
   when determined that there is the authenticated Wi-Fi access point that is accessible to the mobile device through the local wireless communication protocol, instructing the mobile device to connect to a Wi-Fi network provided by the authenticated Wi-Fi access point;
   when determined that there is no authenticated Wi-Fi access point that is accessible to the mobile device through the local wireless communication protocol, determining whether there is a non-authenticated Wi-Fi access point whose capacity is over a predetermined value and that is accessible to the mobile device through a local wireless communication protocol;

when determined that there is the non-authenticated Wi-Fi access point whose capacity is over the predetermined value and that is accessible to the mobile device through the local wireless communication protocol, instructing the mobile device to connect to a Wi-Fi network provided by the non-authenticated Wi-Fi access point whose capacity is over the predetermined value; and instructing the mobile device to disable uplink transmission from the mobile device to the authenticated Wi-Fi access point or the non-authenticated Wi-Fi access point.

2. The method of claim 1, further comprising:
instructing the mobile device to maintain downlink transmission from the authenticated Wi-Fi access point or the non-authenticated Wi-Fi access point to the mobile device.

3. The method of claim 1, further comprising:
initiating a virtual private network (VPN) with the mobile device connected to the Wi-Fi network provided by the authenticated Wi-Fi access point or to the Wi-Fi network provided by the non-authenticated Wi-Fi access point.

4. The method of claim 1, further comprising:
establishing a secure connection with a mobile operating server.

5. The method of claim 4, wherein the establishing the secure connection comprises establishing a virtual private network (VPN) connection between the mobile device and the mobile operating server.

6. The method of claim 1, further comprising:
determining whether a quality of service (QoS) of the Wi-Fi network provided by the authenticated Wi-Fi access point or of the Wi-Fi network provided by the non-authenticated Wi-Fi access point is guaranteed.

7. The method of claim 6, wherein the determining whether the QOS of the Wi-Fi network provided by the authenticated Wi-Fi access point or of the Wi-Fi network provided by the non-authenticated Wi-Fi access point is guaranteed is performed based, at least in part, on at least one of:
a capacity of the Wi-Fi network provided by the authenticated Wi-Fi access point or of the Wi-Fi network provided by the non-authenticated Wi-Fi access point, and
a task to be executed in the mobile device.

8. A method to connect a mobile device to a network, the method comprising:
determining whether there is an authenticated wireless access point that is accessible to the mobile device through a local wireless communication protocol;
when determined that there is no authenticated wireless access point that is accessible to the mobile device through the local wireless communication protocol, determining whether there is a non-authenticated wireless access point whose capacity is over a predetermined value and that is accessible to the mobile device through a local wireless communication protocol; and
when determined that there is the non-authenticated wireless access point whose capacity is over the predetermined value and that is accessible to the mobile device through the local wireless communication protocol, instructing the mobile device to connect to a wireless local area network provided by the non-authenticated wireless access point whose capacity is over the predetermined value.

9. The method of claim 8, further comprising:
initiating a virtual private network (VPN) with the mobile device connected to the wireless local area network provided by the non-authenticated wireless access point.

10. The method of claim 8, further comprising:
establishing a secure connection with a mobile operating server.

11. The method of claim 10, wherein the establishing the secure connection comprises establishing a virtual private network (VPN) connection between the mobile device and the mobile operating server.

12. The method of claim 8, further comprising:
determining whether a quality of service (QoS) of the wireless local area network is guaranteed.

13. The method of claim 12, wherein the determining whether the QOS of the wireless local area network is guaranteed is performed based, at least in part, on at least one of a capacity of the wireless local area network and a task to be executed in the mobile device.

14. A method to connect a mobile device to a network, the method comprising:
determining whether there is a wireless access point that is accessible to the mobile device through a local wireless communication protocol; and
when determined that there is the wireless access point that is accessible to the mobile device through the local wireless communication protocol, instructing the mobile device to connect to a wireless local area network provided by the wireless access point, to disable uplink transmission from the mobile device to the wireless access point through the wireless local area network, and to maintain downlink transmission from the wireless access point to the mobile device through the wireless local area network,
wherein the determining whether there is the wireless access point that is accessible to the mobile device through the local wireless communication protocol includes determining whether there is at least one of an authenticated wireless access point and a non-authenticated wireless access point whose capacity is over a predetermined value around the mobile device, and
wherein the instructing the mobile device to connect to the wireless local area network provided by the wireless access point includes instructing the mobile device to connect to the wireless local area network provided by the at least one of the authenticated wireless access point and the non-authenticated wireless access point whose capacity is over the predetermined value.

15. The method of claim 14, further comprising:
initiating a virtual private network (VPN) with the mobile device connected to the wireless local area network provided by the authenticated wireless access point or the non-authenticated wireless access point.

16. The method of claim 14, further comprising:
establishing a secure connection with a mobile operating server.

17. The method of claim 16, wherein the establishing the secure connection comprises establishing a virtual private network (VPN) connection between the mobile device and the mobile operating server.

18. The method of claim 14, further comprising:
determining whether a quality of service (QoS) of the wireless local area network is guaranteed.

19. The method of claim 18, wherein the determining whether the quality of service (QoS) of the wireless local area network is guaranteed is performed based, at least in part, on at least one of a capacity of the wireless local area network and a task to be executed in the mobile device.

20. The method of claim 14, further comprising:
when determined that there is no non-authenticated access point whose capacity is over the predetermined value and that is accessible to the mobile device through the local wireless communication protocol, instructing the mobile device to connect to a mobile telecommunications network.

* * * * *